July 25, 1933.     C. C. FARMER     1,919,423
FLUID PRESSURE BRAKE
Filed Oct. 16, 1931     2 Sheets-Sheet 1
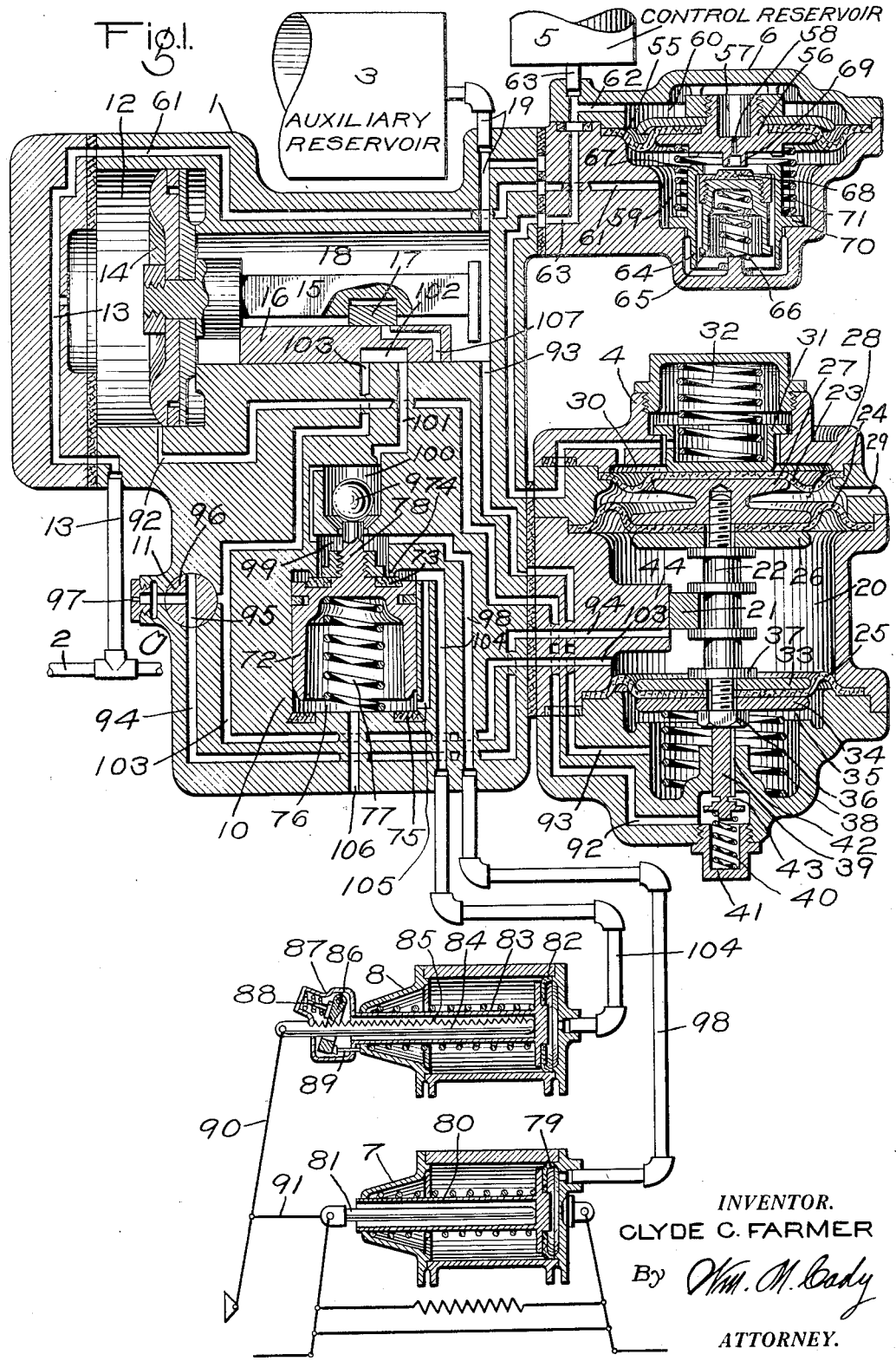
INVENTOR.
CLYDE C. FARMER
By Wm. M. Cady
ATTORNEY.

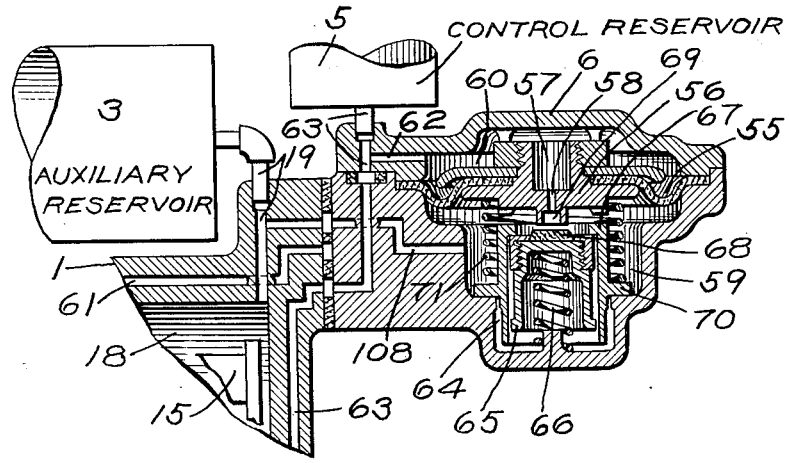
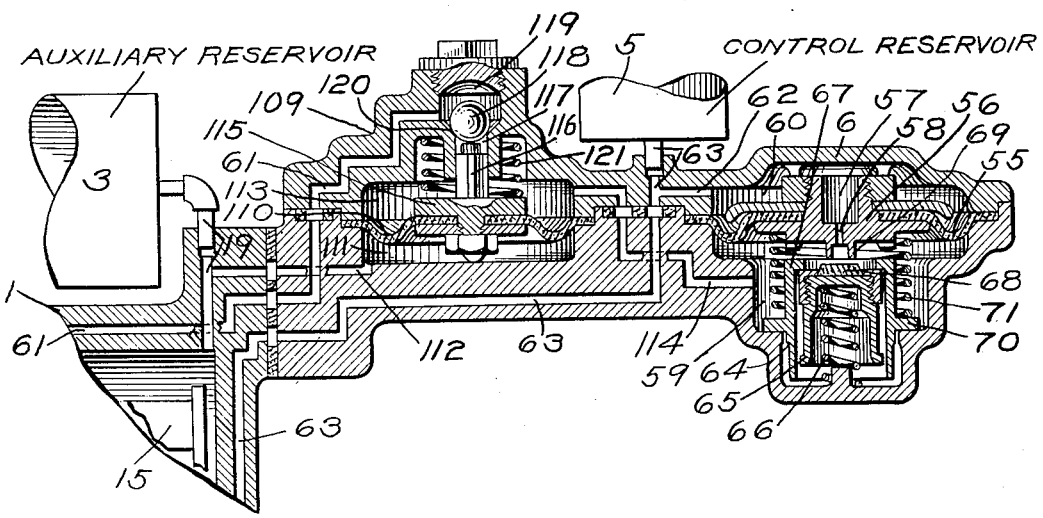

Patented July 25, 1933

1,919,423

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 16, 1931. Serial No. 569,163.

This invention relates to fluid pressure brake equipment of the type shown and described in my prior patents numbered 1,816,079 and 1,819,642 and more particularly to the means for relieving the control reservoir of such equipment of an overcharge.

To relieve the control reservoir of the equipment disclosed in either of the above mentioned patents of an overcharge, a predetermined or over-reduction in brake pipe pressure is effected which causes the equipment to function to vent fluid under pressure from the control reservoir. When such a reduction in brake pipe pressure is effected an application of the brakes will result. On some railroads it may be considered objectionable to effect an application of the brakes when relieving the control reservoir of an overcharge.

The principal object of my invention is to provide a fluid pressure brake equipment of the above type with means whereby the control reservoir may be relieved of an overcharge without the equipment functioning to effect an application of the brakes.

It is well known that in a train when the brake pipe, brake pipe hose and hose couplings are in good condition there will be leakage of fluid under pressure from the brake pipe at a slow rate, say for instance, approximately eight pounds in one minute with the brake pipe charged to seventy pounds, or approximately six pounds in one minute with the brake pipe charged to sixty pounds. According to another feature of my invention, I take advantage of this expected condition of the brake pipe by providing the brake equipment with means which will permit fluid under pressure to flow from the control reservoir, either directly to the brake pipe or to the brake pipe by way of the auxiliary reservoir, so long as the rate of brake pipe reduction does not equal that required to effect a service application of the brakes on the train, thus rendering it possible to relieve the control reservoir of an overcharge without an application of the brakes being effected.

A further object of my invention is to provide a fluid pressure brake equipment of the above mentioned type with novel means for so governing the flow of fluid under pressure to the control reservoir as to prevent the reservoir from being unintentionally overcharged.

Other objects and advantages will appear in the following more detailed description of the invention.

In the accompanying drawings; Fig. 1 is a diagrammatic view, mainly in section, of a fluid pressure brake equipment embodying one form of my invention; Fig. 2 is a fragmentary sectional view showing a modification of the invention; and Fig. 3 is a fragmentary sectional view showing another modification of the invention.

As shown in Fig. 1 of the drawings, the brake equipment embodying my invention, may comprise a triple valve device 1, a brake pipe 2, an auxiliary reservoir 3, a control valve device 4, a control reservoir 5, a control reservoir charging and discharging valve device 6, an empty brake cylinder 7, a load brake cylinder 8, a quick inshot valve 9, a load cylinder cut-in valve device 10, and a release change-over valve device 11.

The triple valve device 1 may comprise a casing having a piston chamber 12 which is connected to the brake pipe 2 through a pipe and passage 13, and contains a piston 14 having a stem 15 adapted to operate a main slide valve 16 and an auxiliary slide valve 17 contained in a chamber 18 connected though a passage and pipe 19 to the auxiliary reservoir 3.

The control valve device 4 may comprise a casing having a valve chamber 20 containing a slide valve 21 which is operatively connected to a stem 22, which is adapted to be operated by spaced flexible diaphragms 23, 24 and 25 secured in the casing. The diaphragms 23 and 25 are of equal area and the diaphragm 24 is of greater area than either diaphragm 23 or 25.

The flexible diaphragm 24 is clamped between a follower plate 26, contained in the chamber 20, and a follower member 27 contained in chamber 28 constantly open to the atmosphere through a passage 29. The follower member 27 has screw-threaded connection with the stem 22 and the upper end of said member engages the under side of the diaphragm 23.

Contained in a chamber 30 at one side of the diaphragm 23, is a movable stop 31 which is subject on one side, to the pressure of a spring 32.

The flexible diaphragm 25 is clamped between a follower plate 33, contained in the chamber 20, and a follower plate 34, contained in a chamber 35, through the medium of a nut 36 having screw-threaded connection with the lower end of the stem 22, which end passes through the follower plates and the diaphragm, the upper side of the follower plate 33 abutting a collar 37 formed on the stem 22 and the nut 36 engaging the under side of the follower plate 34. Contained in the chamber 35 and interposed between and seating on the follower plate 34 and the casing is a coil spring 38.

Within the chamber 35, the lower end of the stem 22 engages the upper end of a fluid pressure supply control member 39 which is slidably mounted in the casing and which is subject to the pressure of a coil spring 40 contained in a chamber 41 and interposed between the lower end of the member and the casing.

The member 39 is provided with a longitudinal groove 42, the lower end of which opens into a circular groove 43 formed in the member adjacent its lower end, said grooves establishing communication from the chamber 41 to the chamber 35.

Integral with the casing and contained in the chamber 20 is a lug 44, which, at its end, is provided with a seat for the slide valve 21.

The combined charging and discharging valve device 6 may comprise a casing in which there is operatively mounted a flexible diaphragm 55 which has a valve seat member 56 secured thereto, said valve seat member having a passage 57 which is restricted at 58 and which is adapted to form a communication between chambers 59 and 60 at opposite sides of the diaphragm. The chamber 59 is connected to the brake pipe passage 13 and consequently to the triple valve piston chamber through a passage 61. The chamber 60 is connected, through a passage 62, to a passage 63 which leads from the control reservoir 5 to the diaphragm chamber 30 in the control valve device 4.

Contained in the chamber 59 of the valve device 6, and secured to the casing thereof, is a valve cage 64 in which a valve member 65, subject to the pressure of a coil spring 66, is movably mounted, said cage having an annular flange 67 adapted to limit movement of the valve member in one direction. The valve member 65 carries a valve 68 which is adapted to be engaged by an annular seat rib 69 formed on the member 56.

Also contained in the chamber 59 and interposed between and seating on the member 56 and an annular flange 70 of the cage 64, is a light coil spring 71, which, when the pressures of fluid in the chambers 59 and 60 are substantially equal, acts to maintain the seat rib 69 of the member 56 out of engagement with the valve 68, thereby maintaining the communication between the chambers 59 and 60 open as shown in Fig. 1.

The load cylinder cut-in valve device 10 may comprise a casing containing a valve piston 72 having a gasket 73 mounted in one end thereof adapted to seal against an annular seat rib 74 formed on the casing. The other end of the valve piston is adapted to seal against a gasket 75 mounted in the casing. Contained in a chamber 76 at one side of the valve piston, is a coil spring 77 which acts on the valve piston to normally maintain the gasket 73 in sealing engagement with the seat rib 74 and the valve end of the valve piston out of sealing engagement with the gasket 75.

The valve piston 72 is provided with an upwardly extending centrally arranged projection 78, the end of which is adapted with the quick inshot valve 9 to control the operation of the valve.

The empty brake cylinder 7 may comprise a cylinder containing a piston 79 having a hollow stem 80 in which there is mounted a push rod 81, the outer end of the push rod being operatively connected with the usual brake levers and rods in any desired manner.

The load brake cylinder 8 may comprise a cylinder containing a piston 82 having a hollow stem 83 in which there is mounted a push rod 84 having a series of notches 85 formed therein with which a latch 86 is adapted to engage to maintain the adjustment of the push rod 84 when the load brake cylinder is being operated. This latch is operatively mounted in a box or casing 87 carried by the outer end of the hollow stem 83, and is subject to the action of a spring pressed plunger 88 which at all times tends to urge the latch into engagement with the push rod 84 within the notches 85. When the load brake cylinder is in release position as shown in Fig. 1, the latch 86 is held out of locking engagement with the push rod by the engagement of a pin 89 with the adjacent end of the cylinder, which pin is slidably mounted in the latch casing 87.

The outer end of the push rod 84 of the load brake cylinder is connected to the outer end of the empty push rod 81 of the empty brake cylinder 7 through the medium of the usual fulcrumed lever 90 and a rod 91.

In applying the brakes, the empty brake cylinder 7 functions to take up the slack in the brake rigging and as it is thus functioning, the push rod 84 of the load brake cylinder 8 is moved outwardly, relative to the hollow stem 83, by the lever 90. When a predetermined pressure has been obtained in the empty brake cylinder, the load brake cylinder is brought into operation by the operation of the valve device 10, and the piston 82, stem 83 and latch casing 87 are moved outwardly. As the latch casing is thus moved, the pressure on the pin 89 is relieved, permitting the spring pressed plunger 88 to act to force the latch 86 into locking engagement with the push rod 84. A continued outward movement of the piston 82 will now increase the braking force on the brake levers and rods and consequently on the usual brake shoes (not shown).

It will here be understood that, with the exception of the control reservoir charging and discharging valve device 6, the several parts of the equipment hereinbefore described in detail are substantially the same construction as the corresponding parts shown and described in my prior Patent No. 1,819,642, and that these parts function to control the brakes in substantially the same manner as is described in said patent. Since the details of the valve device 6 and its operation to control the supply of fluid under pressure from the brake pipe to the control reservoir and to vent fluid under pressure from the control reservoir to the brake pipe to eradicate an overcharge in the control reservoir is all that differs from the equipment shown and described in my Patent No. 1,819,642, the following description will be limited to the operation of the equipment in so far as the valve device 6 is concerned.

In initially charging the equipment, fluid under pressure supplied to the brake pipe 2 flows to the piston chamber 12 in the triple valve device 1 through pipe and passage 13 causing the piston 14 to assume its innermost or release position as shown in Fig. 1, carrying with it, through the medium of the stem 15, the slide valves 16 and 17. With the piston in this position, fluid under pressure supplied to the piston chamber 12 flows to the auxiliary reservoir 3 through a choked passage 92, chamber 41 in the control valve device 4, grooves 43 and 42 in the member 39, diaphragm chamber 35, a choked passage 93, valve chamber 18 in the triple valve device and passage and pipe 19.

Fluid under pressure supplied to the passage 13 flows therefrom to the control reservoir 5 and to the diaphragm chamber 30 in the control valve device 4 through passage 61, chamber 59 in the valve device 6, restricted passage 57 in the valve seat member 56, diaphragm chamber 60 in the valve device 6, passage 62 and passage 63.

The restricted portion 58 of the passage 57 so restricts the flow of fluid from the brake pipe to the control reservoir 5, that when the usual brake valve device (not shown) is moved to full release position to quickly charge or recharge the equipment, the control reservoir pressure will be increased at substantially the same rate as the auxiliary reservoir pressure is being increased.

The flexible diaphragms 23 and 25 of the control valve device 4 are of equal area and since the pressures of fluid supplied to the diaphragm chambers 30 and 35 are substantially equal, the spring 38 acts to maintain the diaphragm 23 in engagement with the stop 31. While the diaphragm is in engagement with the stop 31, the control slide valve 21 is in a position uncovering a passage 94, thus maintaining communication open from the diaphragm chamber to the atmosphere through passage 94, a port 95 in the valve plug 96 of the release change-over valve device 11 and a restricted atmospheric passage 97.

While the equipment is thus being initially charged, the valve piston 72 of the valve device 10 will be maintained in its uppermost position by the action of the spring 77 and will in turn maintain the valve 9 unseated, so that the empty brake cylinder 7 is open to the chamber 20 in the control valve device and consequently to the atmosphere, through a pipe and passage 98, a chamber 99 above the inner seated area of the valve piston 72, past the unseated valve 9, through a chamber 100 containing the valve 9, a passage 101, a cavity 102 in the main slide valve 16 of the triple valve device, and a passage 103. With the valve piston 72 in this position, the load brake cylinder 8 is open to the atmosphere through a pipe and passage 104, a branch passage 105, past the unseated lower end of the valve piston 72, through chamber 76 and a passage 106.

With the equipment thus normally charged and the brake cylinders open to the atmosphere, a service application of the brakes is effected by making a brake pipe reduction at a service rate in the usual well known manner, which results in a corresponding reduction in the pressure of fluid in the triple valve piston chamber 12. Fluid under pressure in the slide valve chamber 18 now causes the triple valve piston 14 and stem 15 to operate to first shift the auxiliary slide valve 17 relative to the main slide valve 16 to a position uncovering a service port 107 in the main slide valve and to then shift both slide valves to their application position, in which position, fluid under pressure supplied to the valve chamber 18 from the auxiliary reservoir 3, flows through the port 107, passage 101 and past the valve 9 and valve device 10 to the brake cylinders 7 and 8 in the same manner as described in my prior Patent No. 1,819,642.

With the triple valve piston 14 in service position, passage 92 is connected to the triple valve chamber 18 so that the pressure of fluid in the chamber 35 in the control valve device 4 reduces with the auxiliary reservoir pressure in chamber 18, causing the control valve device to function in the same manner as described in my Patent No. 1,819,642.

When in effecting an application of the brakes, the brake pipe pressure is reduced at a service rate, the pressure of fluid in the chamber 59 is reduced at a corresponding rate and, since the restricting portion 58 of the passage 57 will not permit fluid under pressure to flow from the chamber 60 and consequently from the control reservoir 5 and diaphragm chamber 30 of the control valve device 4 at as fast a rate as the pressure of fluid in the chamber 59 is reducing, the pressure of fluid in chamber 60 causes the diaphragm to flex downwardly, carrying the seat member 56 with it, the spring 71 offering but slight resistance to said movement. When the member 56 is thus moved, the seat rib 69 seats on the gasket 68 and thus one end of the passage 67 is closed so that flow of fluid from the chamber 60 to the chamber 59 is prevented, and as a consequence, the control reservoir 5 and diaphragm chamber 30 will remain substantially fully charged.

After the seat rib 69 engages the gasket 68, the diaphragm 55 continues to flex downwardly and, through the medium of the seat member 56, moves the valve member 65 downwardly against the opposing pressure of the spring 66, until such time as the member 56 is brought to a stop by its engagement with the upper end of the valve cage 64. By making the valve member 65 yieldable to the movement of the valve seat member 56, the gasket 68 is subjected to the pressure of the spring 66 which is only great enough to insure an air tight seal being maintained between the gasket and seat rib and not to the heavy force which may be developed through the action of the diaphragm 55 and which might cause the gasket to be cut or otherwise damaged.

To release the brakes after a service application, the pressure of fluid in the brake pipe 2 is increased in the usual well known manner, causing the triple valve device 1 and control valve device 4 to function to release the brakes in the same manner as described in Patent No. 1,819,642.

This increase in the pressure of fluid in the brake pipe in releasing the brakes is also effective in the chamber 59 in the valve device 6 and when the pressure in this chamber becomes substantially equal to the pressure of fluid in chamber 60, the spring 71 acts to move the diaphragm 55 and valve seat member 56 to their uppermost position as shown in Fig. 1, in which position the seat rib 69 is out of engagement with the gasket 68 and communication is again established between the chambers 59 and 60.

In order to control a train on a grade, it is the practice to alternately apply and partially release brakes a number of times in a manner commonly termed cycling. To practice cycling by the use of my improved equipment, the engineer, preparatory to the train descending a grade, causes the equipment to be overcharged, say for instance five or more pounds in excess of the normal pressure.

The first application of the brakes, with the train on the descending grade, will be effected in substantially the same manner as has hereinbefore been described in connection with a service application of the brakes, the valve device 6 operating to close communication from the control reservoir 5 and diaphragm chamber 30 of the control valve device to the brake pipe 2.

The brake pipe 2 is now recharged to the normal pressure, causing the triple valve device 1 and control valve device 4 to function to release fluid under pressure from the brake cylinders. Upon thus recharging the brake pipe, the diaphragm 55 of the valve device 6 will be maintained in its downwardly flexed condition by fluid under pressure in the chamber 60 supplied from the overcharged control reservoir 5. Now when the pressure of fluid in chamber 20 of the valve device 4 is reduced sufficiently that the upward pressure of fluid on the under side of the large diaphragm 24, as well as the upward pressure of fluid in chamber 35 on the under side of the diaphragm 25, is less than the downward pressure of fluid in the chamber 30 on the upper side of the diaphragm 23 and the downward pressure of fluid in the chamber 20 on the upper side of the diaphragm 25, the several parts of the control valve device will be caused to function to shift the control slide valve 21 downwardly to a position in which it laps the passage 94, thus closing communication from the chamber 20 to the atmosphere and retaining a predetermined pressure in the brake cylinders which is proportionate to the overcharge of the control reservoir, said overcharge being governed by the engineer according to the condition of the grade. Now upon effecting a re-application of the brakes, the brake cylinder pressure obtained will exceed that retained in the brake cylinders from the previous application, by an amount proportional to the brake pipe reduction.

If, at the foot of the grade, the engineer desires to render the control valve device 4 ineffective as a brake cylinder pressure retainer and also desires to relieve the control reservoir 5 of the overcharge, he operates the usual brake valve device (not shown) to release position to connect the main fluid pressure supply such as the main reservoir to the brake pipe and maintains the brake valve device in this position until the brake pipe is charged to substantially its original overcharge and then operates the brake valve device to running position in which fluid is supplied to the brake pipe through the medium of the usual feed valve device (not shown) at a pressure lower than that of the main reservoir.

When the brake pipe 2 is recharged to substantially its original overcharge or, in other words, when the pressure of fluid in chamber 59 in the valve device 6 becomes substantially equal to the pressure of fluid in the chamber 60, the spring 71 acts to move the diaphragm 55 and seat member 56 to their uppermost position as shown in Fig. 1, in which position the seat ring 69 will be out of engagement with the gasket 68 so that the passage 57 in the member 56 again establishes communication between the chambers 59 and 60.

With the brake valve device in running position, leakage of fluid from the brake pipe will effect a reduction in brake pipe pressure and consequently a reduction in the pressure of fluid in the chamber 59 of the valve device 6 at a rate, which under ordinary conditions of service, will not exceed the rate at which fluid is permitted to flow from the chamber 60 through the restricted passage 57 in the member 56, consequently no fluid pressure differential will be created on the diaphragm 55 and the communication between the chamber 59 and 60 will be maintained open by the action of the spring 71 on the diaphragm.

It will thus be seen that, due to leakage of fluid from the brake pipe, the control pressure and brake pipe pressure will reduce together to substantially their normal pressure.

In Fig. 2 of the drawings, a modified form of the invention is illustrated in which the chamber 59 in the valve device 6, instead of being connected directly to the brake pipe 2, as shown in Fig. 1, is connected to the auxiliary reservoir passage 19 through a passage 108. By this arrangement, in charging and recharging the equipment, the control reservoir cannot be charged to a pressure higher than the auxiliary reservoir pressure since the pressures in these reservoirs may equalize through the restricted passage 57 in the seat member 56 of the valve device 6.

When, in effecting an application of the brakes, the several parts of the triple valve device 1, in this modified form of the invention, move to service position, fluid under pressure flows from the auxiliary reservoir to the brake cylinders and effects a reduction in auxiliary reservoir pressure and also in the pressure of fluid in the chamber 59 and the valve device 56. Upon thus effecting a reduction in the pressure of fluid in chamber 59 the several parts of the valve device 6, will function to close communication between the chambers 59 and 60 in substantially the same manner as described in connection with the form of equipment shown in Fig. 1.

In Fig. 3 another modification of the invention is illustrated in which a regulating valve device 109 is employed which, when the equipment is being charged or recharged with the brake valve device in full release position, functions to so regulate the charging of the control reservoir that the control reservoir cannot become charged to a pressure higher than that to which the auxiliary reservoir may be charged.

This valve device 109 may comprise a casing in which there is mounted a flexible diaphragm 110 having at one side a chamber 111 which is open to the auxiliary reservoir 3 through a passage 112 and passage and pipe 19, and having at its other side a chamber 113 which is open to the chamber 59 in the valve device 6 through a passage 114.

Contained in the chamber 113 and clamped to the diaphragm 110 is a follower 115 having a fluted stem 116 projecting therefrom which is guided within a passage 117 in the casing and which is adapted to engage and control the operation of a ball valve 118 contained in a chamber 119 which is directly connected to the brake pipe by way of passage 61 and passage and pipe 13. The ball valve 118 is adapted to seat on a valve seat 120 formed on the casing to close communication from the valve chamber 119 to the chamber 113 by way of passage 117. Also contained in the chamber 113 and interposed between and engaging the casing and the follower 115, is a light coil spring 121 which, when the pressures of fluid in chambers 111 and 113 are substantially equal, acts to maintain the diaphragm and thereby the stem 116 in the position shown in Fig. 3.

In charging and recharging the equipment shown in Fig. 3, the chamber 111 in the valve device 110 will be supplied with fluid under pressure at the same time as fluid is supplied to the auxiliary reservoir. As before mentioned, the coil spring 121 is light so that when fluid under pressure is supplied to the chamber 111 the resistance of this spring will be overcome and the diaphragm will be flexed upwardly causing the stem 116 to act to unseat the ball valve 118. With the ball valve 118 thus unseated fluid under pressure which is supplied to the ball valve chamber 119 from the brake pipe 2 by way of passage 61, flows to the control reservoir 5 by way of passage 117 in the valve device 109, diaphragm chamber 113, passage 114, chamber 59 in the valve device 6, passage 57 in the member 56, chamber 60, passage 62, and passage and pipe 63. When the control reservoir pressure in chamber 113 of the valve device 110 becomes substantially equal to auxiliary reservoir pressure in chamber 111 the spring 121 will act to cause the diaphragm and stem 116 to move downwardly to the position shown. When the stem is thus moved it permits the ball valve 118 to seat, thus closing off the flow of fluid to the control reservoir. Now as the auxiliary reservoir pressure is increased the diaphragm will again be flexed upwardly which, through the medium of the stem 116, causes the ball valve 118 to be again unseated permitting fluid under pressure to flow to the control reservoir. These operations are continued until the equipment is fully charged thus regulating the charging of the control reservoir according to the increase in auxiliary reservoir so that the control reservoir cannot be charged to a higher pressure than that to which the auxiliary reservoir is charged.

When a reduction in brake pipe pressure is effected to apply the brakes, fluid under pressure from the chamber 59 of the valve device 6 will unseat and flow past the ball valve 118 to the brake pipe and the valve device 6 will, due to the reduction in the pressure of fluid in chamber 59, operate in the same manner as the valve device 6 of the form of equipment shown in Fig. 1, to close communication from the control reservoir 5 to the brake pipe.

In relieving the control reservoir of an overcharge, the fluid under pressure from the control reservoir unseats and flows past the ball valve 118 to the brake pipe.

It will be apparent from the foregoing description of the three forms of my invention that I have provided means which function to regulate the charging of the control reservoir 5 so that the reservoir will not become unintentionally overcharged, that is to say, will not be charged to a pressure higher than that of the auxiliary reservoir, when the equipment is being initially charged or recharged to effect the release of the brakes, and which is adapted to function to bottle up the control reservoir pressure when a reduction in brake pipe pressure is effected at a service rate, and which is adapted to further function to establish communication from the control reservoir 5 to the brake pipe 2 so that when the control reservoir is overcharged and the other portions of the equipment are charged to substantially the pressure of fluid in the overcharged reservoir, the reservoir will be relieved of the overcharge by leakage of fluid from the brake pipe.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a normally charged reservoir and a brake cylinder adapted to be supplied with fluid under pressure from said reservoir to effect an application of the brakes, of a normally charged control reservoir, valve mechanism subject to the pressure of fluid from said control reservoir for controlling the pressure of fluid in the brake cylinder, and means normally establishing communication through which fluid under pressure is adapted to be supplied to and released from said control reservoir, said means being operable to close said communication upon the effecting of an application of the brakes.

2. In a fluid pressure brake, the combination with a normally charged reservoir and a brake cylinder adapted to be supplied with fluid under pressure from said reservoir to effect an application of the brakes, of a normally charged control reservoir, valve mechanism subject to the pressure of fluid from said reservoir for controlling the pressure of fluid in the brake cylinder, and means normally establishing communication through which fluid under pressure is adapted to be supplied to and released from said control reservoir, said means being operable to close said communication upon the effecting of an application of the brakes, and operable to open said communication upon effecting the release of the brakes.

3. In a fluid pressure brake, the combination with a normally charged reservoir and a brake pipe and a brake cylinder adapted to be supplied with fluid under pressure from said reservoir to effect an application of the brakes, of a normally charged control reservoir, valve mechanism subject to the pressure of fluid from said control reservoir for controlling the pressure of fluid in said brake cylinder, means normally establishing communication between the brake pipe and control reservoir and operative upon effecting a reduction in brake pipe pressure at a predetermined rate for closing said communication.

4. In a fluid pressure brake, the combination with a normally charged reservoir, a brake pipe and a brake cylinder adapted to be supplied with fluid under pressure from said reservoir to effect an application of the brakes, of a normally charged control reservoir, valve mechanism subject to the pressure of fluid from said control reservoir for controlling the pressure of fluid in said brake cylinder, and means establishing communication between said brake pipe and control reservoir when the control reservoir and brake pipe pressures are substantially equal, said means being operable upon a reduction in brake pipe pressure at a predetermined rate to close said communication.

5. In a fluid pressure brake, the combination with a normally charged reservoir, a brake pipe and a brake cylinder adapted to be supplied with fluid under pressure from said reservoir to effect an application of the brakes, of a normally charged control reservoir, valve mechanism subject to the pressure of fluid from said control reservoir for controlling the pressure of fluid in said brake cylinder, and means establishing communication between said brake pipe and control reservoir when the control reservoir and brake pipe pressure are substantially equal, said means being responsive to a reduction in brake pipe pressure at a predetermined fast rate to close said communication and being unresponsive to a reduction in brake pipe pressure at a slower rate.

6. In a fluid pressure brake, the combination with a brake pipe and a brake cylinder, of an auxiliary reservoir and a control reservoir normally charged with fluid under pressure from said brake pipe means operative upon a reduction in brake pipe pressure to supply fluid under pressure from the auxiliary reservoir to the brake cylinder to effect an application of the brakes, valve mechanism subject to the opposing pressures of the auxiliary and control reservoirs for controlling the brake cylinder pressure, and means establishing communication between said reservoirs when the pressures of said reservoirs are substantially equal, said means being operable to close said communication upon a reduction in auxiliary reservoir pressure in effecting an application of the brakes.

7. In a fluid pressure brake, the combination with a brake pipe and a brake cylinder, of a normally charged auxiliary reservoir and a normally charged control reservoir, a valve device operated upon a reduction in brake pipe pressure for supplying fluid under pressure from said auxiliary reservoir to said brake cylinder to effect an application of the brakes and operated upon an increase in brake pipe pressure to establish communication through which fluid under pressure is released from the brake cylinder to effect a release of the brakes, valve mechanism subject to the opposing pressures of said reservoirs for controlling the release of fluid under pressure from said brake cylinder, and means normally establishing communication through which fluid under pressure is adapted to be either supplied to or released from said control reservoir, said means being operative to close said communication upon the effecting of an application of the brakes.

8. In a fluid pressure brake, the combination with a brake pipe and a brake cylinder, of a normally charged auxiliary reservoir and a normally charged control reservoir, a valve device operated upon a reduction in brake pipe pressure for supplying fluid under pressure from said auxiliary reservoir to said brake cylinder to effect an application of the brakes and operated upon an increase in brake pipe pressure to establish communication through which fluid under pressure is released from the brake cylinder to effect a release of the brakes, valve mechanism subject to the opposing pressures of said reservoirs for controlling the release of fluid under pressure from said brake cylinder, and means normally establishing communication through which fluid under pressure is adapted to be either supplied to or released from said control reservoir, said means being operative upon said reduction in brake pipe pressure to close said communication.

9. In a fluid pressure brake, the combination with a brake pipe and a brake cylinder, of a normally charged auxiliary reservoir and a normally charged control reservoir, a valve device operated upon a reduction in brake pipe pressure for supplying fluid under pressure from said auxiliary reservoir to said brake cylinder to effect an application of the brakes and operated upon an increase in brake pressure to establish communication through which fluid under pressure is released from the brake cylinder to effect a release of the brakes, valve mechanism subject to the opposing pressures of said reservoirs for controlling the release of fluid under pressure from said brake cylinder, and means normally establishing communication through which fluid under pressure is adapted to be either supplied to or released from said control reservoir, said means being operative upon the supplying of fluid from the auxiliary reservoir to said brake cylinder for closing said communication.

10. In a fluid pressure brake, the combination with a brake pipe and a brake cylinder, of a normally charged auxiliary reservoir and a normally charged control reservoir, a valve device operated upon a reduction in brake pipe pressure for supplying fluid under pressure from said auxiliary reservoir to said brake cylinder to effect an application of the brakes and operated upon an increase in brake pipe pressure to establish communication through which fluid under pressure is released from the brake cylinder to effect a release of the brakes, valve mechanism subject to the opposing pressures of said reservoirs for controlling the release of fluid under pressure from said brake cylinder, and means establishing communication between said brake pipe and control reservoir when the brake pipe and control reservoir pressures are substantially equal, said means being operable upon said reduction in brake pipe pressure to close said communication.

11. In a fluid pressure brake, the combination with a brake pipe and a brake cylinder, of a normally charged auxiliary reservoir and a normally charged control reservoir, a valve device operated upon a reduction in brake pipe pressure for supplying fluid under pressure from said auxiliary reservoir to said brake cylinder to effect an application of the brakes and operated upon an increase in brake pipe pressure to establish communication through which fluid under pressure is released from the brake cylinder to effect a release of the brakes, valve mechanism subject to the opposing pressures of said reservoirs for controlling the release of fluid under pressure from said brake cylinder, and means establishing communication between said reservoirs when the pressures of said reservoirs are substantially equal, said means being operable to close said communication upon the supplying of fluid under pressure from said auxiliary reservoir to the brake cylinder.

12. In a fluid pressure brake, the combination with a brake pipe, a brake cylinder, an auxiliary reservoir and a control reservoir, both of said reservoirs being adapted to be supplied with fluid under pressure from the brake pipe, of means for regulating the flow of fluid to the control reservoir so as to prevent the control reservoir pressure from increasing at a faster rate than the rate of increase in auxiliary reservoir pressure, a triple valve device operative upon a reduction in brake pipe pressure to establish communication through which fluid under pressure is supplied from the auxiliary reservoir to the brake cylinder to effect an application of the brakes and operative upon an increase in brake pipe pressure for establishing communication through which fluid under pressure is released from the brake cylinder to effect the release of the brakes, and valve mechanism subject to the opposing pressures of said reservoirs for controlling the release of fluid under pressure from the brake cylinder, said means for regulating the flow of fluid to the control reservoir normally establishing communication through which fluid under pressure is adapted to flow to and from the control reservoir and operative to close said communication upon the effecting of an application of the brakes.

13. In a fluid pressure brake, the combination with a brake pipe, a brake cylinder, an auxiliary reservoir and a control reservoir, both of said reservoirs being normally charged to substantially equal pressure, valve device operated upon a reduction in brake pipe pressure to establish communication through which fluid under pressure is supplied from said auxiliary reservoir to the brake cylinder to effect an application of the brakes and operated upon an increase in brake pipe pressure to establish communication through which fluid under pressure is released from the brake cylinder to effect the release of the brakes, a valve mechanism subject to the opposing pressures of said reservoirs to control the pressure of fluid in the brake cylinder, and means establishing communication through which fluid under pressure is permitted to flow from the control reservoir at a rate corresponding substantially to the rate of leakage from said brake pipe, said means being operable to close said communication upon an application of the brakes being initiated.

14. In a fluid pressure brake, the combination with a brake pipe, a brake cylinder, an auxiliary reservoir and a control reservoir, both of said reservoirs being normally charged to substantially equal pressures, valve device operated upon a reduction in brake pipe pressure to establish communication through which fluid under pressure is supplied from said auxiliary reservoir to the brake cylinder to effect an application of the brakes and operated upon an increase in brake pipe pressure to establish communication through which fluid under pressure is released from the brake cylinder to effect the release of the brakes, a valve mechanism subject to the opposing pressures of said reservoirs to control the pressure of fluid in the brake cylinder, and means subject to the opposing pressures of the control reservoir and brake pipe and adapted to establish communication between the control reservoir and the brake pipe when the pressures of said reservoirs are substantially equal, said means being operable to close said communication upon a reduction in brake pipe pressure in effecting an application of the brakes.

15. In a fluid pressure brake, the combination with a brake pipe and a brake cylinder, of an auxiliary reservoir adapted to be charged with fluid under pressure from the brake pipe, a control reservoir adapted to be charged with fluid under pressure from the brake pipe, means operative to maintain the charging rate of said control reservoir substantially equal to the charging rate of said auxiliary reservoir and adapted to maintain a communication open from said control reservoir to said brake pipe when the control reservoir and brake pipe pressures are substantially equal to permit the pressure of fluid in the control reservoir to reduce into said brake pipe when the brake pipe pressure is reduced by leakage, a triple valve device operative upon a reduction in brake pipe pressure at a service rate to establish communication through which fluid under pressure is supplied from said auxiliary reservoir to the brake cylinder and operative upon an increase in brake pipe pressure for establishing communication through which fluid under pressure is released from the brake cylinder, and a valve mechanism subject to the opposing pressures of said reservoirs for controlling the release of the brakes, said means being operative to close the communication from said control reservoir to the brake pipe when the brake pipe pressure is reduced at said service rate.

16. In a fluid pressure brake, the combination with a brake pipe, a brake cylinder, an auxiliary reservoir and a control reservoir of a triple valve device subject to an increase in brake pipe pressure for establishing communication through which fluid under pressure is supplied to both of said reservoirs and for establishing communication through which fluid under pressure is released from the brake cylinder and operative upon a reduction in brake pipe pressure at a predetermined rate to close said communications and to establish another communication through which fluid under pressure is released from the brake cylinder, a valve mechanism subject to the opposing pressures of said reservoirs for controlling the release of fluid under pressure from the brake cylinder, and means establishing communication from the control reservoir to the auxiliary reservoir and consequently to the brake pipe when the auxiliary and control reservoir pressures are substantially equal to permit fluid under pressure to flow from the control reservoir to the brake pipe when brake pipe pressure is reduced by leakage, said means operating to close said communication upon the reduction of auxiliary reservoir pressure effected by the flow of fluid from the auxiliary reservoir to the brake cylinder in effecting an application of the brakes.

17. In a fluid pressure brake, the combination with a brake pipe, a brake cylinder, a control reservoir and an auxiliary reservoir adapted to be charged with fluid under pressure from the brake pipe, a valve device subject to the opposing pressures of the auxiliary reservoir and brake pipe for controlling the charging of said control reservoir, means establishing communication through which fluid under pressure flows to the control reservoir and through which fluid under pressure is adapted to flow from the control reservoir to the brake pipe when the control reservoir and brake pipe pressures are substantially equal and there is leakage of fluid from the brake pipe, a triple valve device operative upon a reduction in brake pipe pressure at a predetermined rate for supplying fluid under pressure from the auxiliary reservoir to said brake cylinder to effect an application of the brakes and operative upon effecting an increase in brake pipe pressure for releasing fluid under pressure from the brake cylinder, and valve mechanism subject to the opposing pressures of said reservoirs for controlling the release of fluid under pressure from the brake cylinder, said means being operative to close the communication from said control reservoir to the brake pipe upon effecting a reduction in brake pipe pressure at said predetermined rate.

CLYDE C. FARMER.